(12) United States Patent
Kuhn et al.

(10) Patent No.: US 8,035,836 B2
(45) Date of Patent: Oct. 11, 2011

(54) FAST JOB HALT IN A HIGH SPEED PRESS

(75) Inventors: William C. Kuhn, Kettering, OH (US);
Paul A. Reil, Miamisburg, OH (US)

(73) Assignee: Eastman Kodak Company, Rochester, NY (US)

( * ) Notice: Subject to any disclaimer, the term of this patent is extended or adjusted under 35 U.S.C. 154(b) by 1111 days.

(21) Appl. No.: 11/782,680

(22) Filed: Jul. 25, 2007

(65) Prior Publication Data

US 2009/0027715 A1    Jan. 29, 2009

(51) Int. Cl.
*G06F 15/00* (2006.01)

(52) U.S. Cl. .............. 358/1.15; 358/1.16; 358/1.13; 358/1.14

(58) Field of Classification Search .......... 358/1.15, 358/1.16, 1.13, 1.14, 1.18
See application file for complete search history.

(56) References Cited

U.S. PATENT DOCUMENTS

| | | | |
|---|---|---|---|
| 4,958,298 A | 9/1990 | Okamoto | |
| 5,729,665 A | 3/1998 | Gauthier | |
| 5,873,659 A | 2/1999 | Edwards et al. | |
| 5,966,504 A | 10/1999 | Sity | |
| 6,318,833 B1 | 11/2001 | Lyman et al. | |
| 6,651,116 B1 | 11/2003 | Ludwig et al. | |
| 6,762,855 B1 | 7/2004 | Goldberg et al. | |
| 6,934,058 B2 * | 8/2005 | Kageyama et al. | 358/497 |
| 7,110,129 B2 | 9/2006 | Parrish et al. | |
| 7,190,468 B2 | 3/2007 | Brown et al. | |
| 7,911,636 B2 * | 3/2011 | Kuhn et al. | 358/1.15 |
| 2003/0234959 A1 | 12/2003 | Goldberg | |
| 2004/0246513 A1 | 12/2004 | McKinley et al. | |

FOREIGN PATENT DOCUMENTS

EP    0 863 003 B1    11/2002

* cited by examiner

*Primary Examiner* — Houshang Safaipour
(74) *Attorney, Agent, or Firm* — Robert L. Walker

(57) ABSTRACT

In a printing system and method, job data is distributed in segments to a plurality of downstream processors. The segments are processed in respective downstream processors to provide printable frames, which are stored in respective print queues that each supply one of a plurality of printheads. Printing is initiated. Prior to completion of the printing, a job halt request is received. Disable commands are transmitted to the downstream processors responsive to the job halt request. Acknowledgements of respective disable commands are sent from the downstream processors. The downstream processors are grouped following the sending of respective acknowledgements. The print queues are emptied using the grouped, multi-tasking downstream processors.

21 Claims, 8 Drawing Sheets

FAST JOB HALT IN A HIGH SPEED PRESS

CROSS REFERENCE TO RELATED APPLICATIONS

Reference is made to commonly assigned, co-pending U.S. patent application Ser. No. 11/782,670, entitled: JOB STARTUP CONTROL FOR JOB QUEUING, filed Jul. 25, 2007, in the names of William C. Kuhn and Paul A. Reil, which is hereby incorporated herein by reference.

Reference is made to commonly assigned, co-pending U.S. patent application Ser. No. 11/782,688, entitled: MULTI-HEAD PRESS DATA DELIVERY RATE CONTROL, filed Jul. 25, 2007, in the names of William C. Kuhn, Paul A. Reil and Jeffrey L. Ranley, which is hereby incorporated herein by reference.

FIELD OF THE INVENTION

The invention relates to high speed printing systems and methods and more particularly relates to fast job halt in a high speed press.

BACKGROUND OF THE INVENTION

In commercial printing, it can be beneficial if an operator can efficiently halt a print job while the job is being printed. In some cases, the operator would check something and then resume the printing of that particular job. In other cases, the print job would be aborted and printing is resumed with the next print job in a queue. In either situation, it is desirable that time is not wasted resuming printing.

Very high speed commercial digital presses print variable data at rates of thousands of pages per minute. Typically, the receiver that is printed is in the form of a web that is transported past stationary printheads. During transport, the web has considerable inertia and cannot be readily subjected to rapid changes in speed. It is desirable to continuously transport the web at a constant speed or with relatively slow speed adjustments. The result is a disincentive for the operator to halt a print job, since there is a considerable loss of time, if the web is stopped, or of receiver, if the web is not stopped.

The continuous transport of receiver also necessitates a continuous supply of data in the form of printable frames. This data must be buffered so as to be available as needed, since any delay would result in blank pages if the receiver were not stopped. A further constraint is that considerable time is required to fill a buffer with the printable frames, since the print job is initially supplied in a different form and is converted. That conversion is typically in the form of raster image processing and is performed by one or more downstream processors. The processing speed that defines the sustained output speed of each of the downstream processors is generally limited by the content of the input data, since the time to raster image process a frame tends to be highly data dependant. It is possible to define frames that take a substantial amount of time to prepare for output. Another limitation that affects the raster image processing is the supply of input data to the downstream processors. Variable data supplied by a secondary source can be subject to limitations of communication bandwidth or the processing capability of a host computer. With many print jobs, different portions of the job are simultaneously buffered, being raster image processed, and not yet delivered to the raster image processor. When a print job is halted and is then resumed, the previously buffered data could be used, if available. When a print job is halted and is not resumed, the previously buffered data is no longer needed and must be replaced in the buffer by the next print job. Replacing the data in the buffer imposes another time constraint, particularly if the data is only replaced after the operator makes a decision on whether to proceed with the completion of the original print job. The net result is a further disincentive for the operator to halt a print job. U.S. Pat. No. 6,651,116 discloses an approach to queue management in a high speed printer that includes cancellation of print jobs.

It would thus be desirable to provide improved systems and methods.

SUMMARY OF THE INVENTION

In some presses, there is a consider distance between the first printhead and the last printhead and as a result, the first printhead prints a large number of documents before the first such document arrives at the last printhead. Similarly, at the end of a print job, the first printhead stops printing long before the last printhead stops printing. With high speed printing, the print queues need to be large. In a data system that allows print jobs to be queued up to print one after another without stopping the printer, the need to store print ready data in buffers (queues) increases. Management of the large amounts of buffer memory required for the print buffers can become problematic. A particular problem is halting a current print job and quickly preparing for printing another print job or reprinting the current job under different conditions.

The invention, which is defined by the claims, is directed to ameliorating the above problems. The invention, in broader aspects, provides a printing system and method, in which job data is distributed in segments to a plurality of downstream processors. The segments are processed in respective downstream processors to provide printable frames, which are stored in respective print queues that each supply one of a plurality of printheads. Printing is initiated. Prior to completion of the printing, a job halt request is received. Disable commands are transmitted to the downstream processors responsive to the job halt request. Acknowledgements of respective disable commands are sent from the downstream processors. The downstream processors are grouped following the sending of respective acknowledgements. The print queues are emptied using the grouped, multi-tasking downstream processors.

It is an advantageous effect of the invention that improved printing systems and methods are provided, in which job queues are rapidly emptied following a job halt request.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

High speed variable printing systems are used in the commercial printing industry for printing a wide variety of printing applications from printing short run catalogs, and advertisements to printing transactional printed products such as billings and investment reports.

Figure 1:
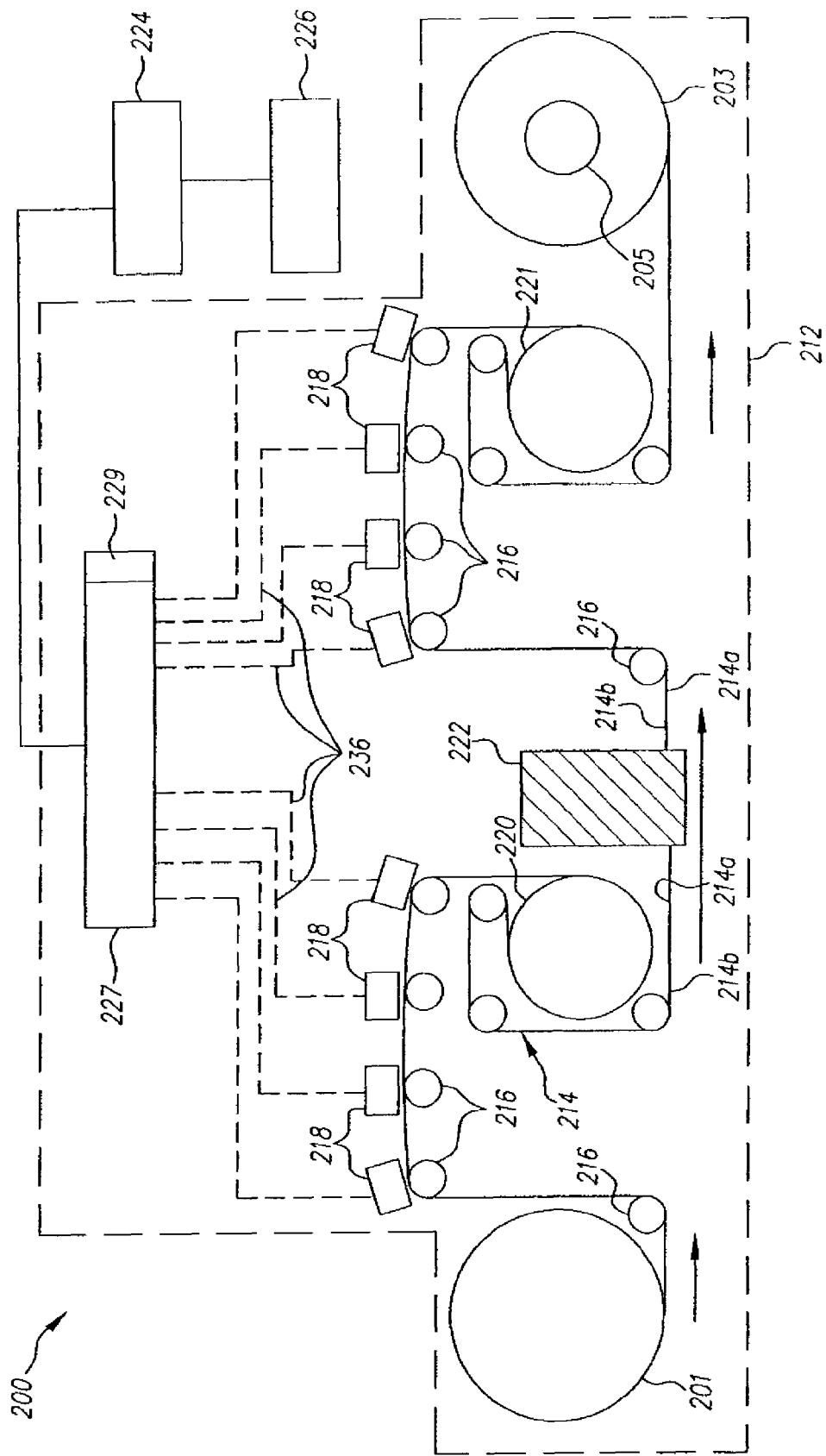
FIG. 1 is a diagrammatical view of an embodiment of the systems.

Referring to FIG. 1, the system 200 has a press (indicated by dashed line 212) that prints on a receiver 214. The term "receiver" refers to media that accepts a printed image and is singular or plural, as indicated by context. A receiver can be multiple cut-sheets. In particular embodiments discussed herein, the receiver is in the form of a web, that is an elongate, continuous piece. The use of a web typically allows the press (also referred to herein as a printer) to attain higher speeds in transport, than other forms of receiver, such as cut-sheets. The receiver is typically paper, but can also be any of a large number of other types of print media. For example, the receiver can be thin or thick paper stock (coated or uncoated) or transparency stock. The receiver has opposed first and second surfaces 214a, 214b one or both of which may be printed.

The receiver 214 in FIG. 1 is a web. The web is moved from a supply 201 to a take-up 203 by a transport 205. Between the supply 201 and take-up 203, the web is threaded around a number of rollers 216 and past a sequence of printheads 218. The printheads can be continuous ink jet printheads, drop on demand ink jet printheads, electrophotographic toning stations (with or without transfer rollers or the like), or other equivalent units of a variable printing technology. For simplicity, in the discussion here, the printheads are generally discussed in terms of an embodiment, in which all of the printheads arranged in a sequence and each printhead extends across the full width of the receiver. It will be understood that like considerations apply to other embodiments. For example, instead of using a full width printhead, a group of printheads can be arranged in parallel (non-sequentially) to print a wider receiver.

The different printheads each print a printable frame. A unit of image data that corresponds to a frame is referred to herein as a "segment". The frames are printed in registry with each other and, in combination, provide a document. The term "document" as used herein, thus, corresponds to the term "page", in ordinary usage and includes both surfaces. (The term "page" is sometimes also used in the art as a technical term to refer to a frame, and is generally avoided here for that reason.) Each frame can define an image area corresponding to the full dimensions as the document or can define a smaller area within those dimensions. Each frame represents a part of a document that is conveniently printed separately. For example, each frame can use a different color of ink. With ink jet printheads, different frames can be used to divide an image into different patterns of relatively spaced apart deposited drops. The resulting combined image is unchanged, but the different patterns improve drying, during the printing process. Two sets of four printheads 218 are shown in FIG. 1. The invention is not limited as to a particular number of printheads or sets of printheads. In FIG. 1, after passing one set of printheads 218, the partially printed image (not shown) on a first side 214b of the receiver 214 is dried by contact with a first heated drum dryer 220. The web is then flipped over by a turn station 222 before passing the second set of printheads 218 and the second side 214a is then dried by a second dryer 221.

In use, printing data is first supplied to a data station 224 by one or more input units 226 from one or more image data sources. The data station includes at least some of the functions necessary to prepare the job data for the printheads and can optionally combine all of the functions in a single unit. The data station can also provide a system manager and user interface (not separately illustrated). The system manager provides a communication hub, and system level administration and control features for other system components. The user interface provides setup and status information for the operation of the system. Via this interface, the user can input to the controller the physical characteristics of the printer, such as the relationships of the printheads, desired colors the system is capable of printing, and other information. Upon a power-up or a reset, the data station initializes the system to a ready state.

As discussed further below, the job data can be a single print job or a series of print jobs. The printing data represents the location, color, and intensity of each pixel that is exposed and is in the form of one or more data files, which typically include or are accompanied by control commands. For example, data files can be supplied in a PDL (page description language) format, such as Postscript or IPDS or IJPDS. Printing data can be supplied from multiple sources, for combination during printing. U.S. Pat. No. 5,729,665, issued to Gauthier, discloses an example of this type of procedure. One input unit 226 is typically a locally connected host computer capable of supplying the printing data in a continuous stream. Software controls the flow of data from the host computer and via a host interface. The connection between the data station and the host computer can be uni-directional or can be bi-directional to allow status information and the like to be presented on a user interface of the host computer. Suitable software for this purpose is well known to those of skill in the art. Other types of input unit can be used instead of or in addition to a host computer. For example, printing data can be supplied by a media reader using transferable media, such as CD's, DVD's, or by network connection from another computer. An image data source is a device that can provide digital data defining a version of the image. Such types of devices are numerous and include computers or microcontrollers, computer workstations, scanners, and digital cameras. Multiple devices can be interconnected on a network. These image data sources are at the front end and generally include an application program that is used to create or find an image to output.

The job data is sent to a data control unit 227, which includes a main controller 228, a memory section 229, and a set of downstream processors 234. The job data is sent to the main controller 228, either directly or via input queue memory. The term "memory" refers to one or more suitably sized logical units of physical memory provided in semiconductor memory or magnetic memory, or the like (illustrated by memory section 229). A particular queue in memory can be a logical division or physical division of memory. If a logical division, the physical memory allocated to that logical division can be in the same or different locations and can change during use, without effecting the logical division. Likewise, a queue provided in a physical unit of memory can be altered logically, for example, by changing a pointer, to change the print queue during use. Memory can include conventional memory devices including solid state, magnetic, optical or other data storage devices and can be fixed within system or can be removable. For example, memory can be an internal memory, such as SDRAM or Flash EPROM memory, or alternately a removable memory, or a combination of both. Removable memory can be of any type, such as a Compact Flash (CF) or Secure Digital (SD) type card inserted into a socket and connected to the processor via a memory interface. Other types of storage that are utilized include without limitation PC-Cards, MultiMedia Cards (MMC), or embedded and/or removable hard drives. Memory is also inclusive of a remote memory system such as a personal computer, computer network or other digital system.

The use of queues is generally discussed herein in relation to movement of print jobs into and out of the print queues. It will be understood that, in some cases, movement of a print in or out of a queue will entrain division of the print job into separately movable portions.

The input queue can provide a large buffer, with a size determined by the speed of the press. The input queue is handled by a control system to supply sufficient data to the press to keep the press running continuously and efficiently. The input queue control system can be provided as a function of the main controller.

Figure 2:
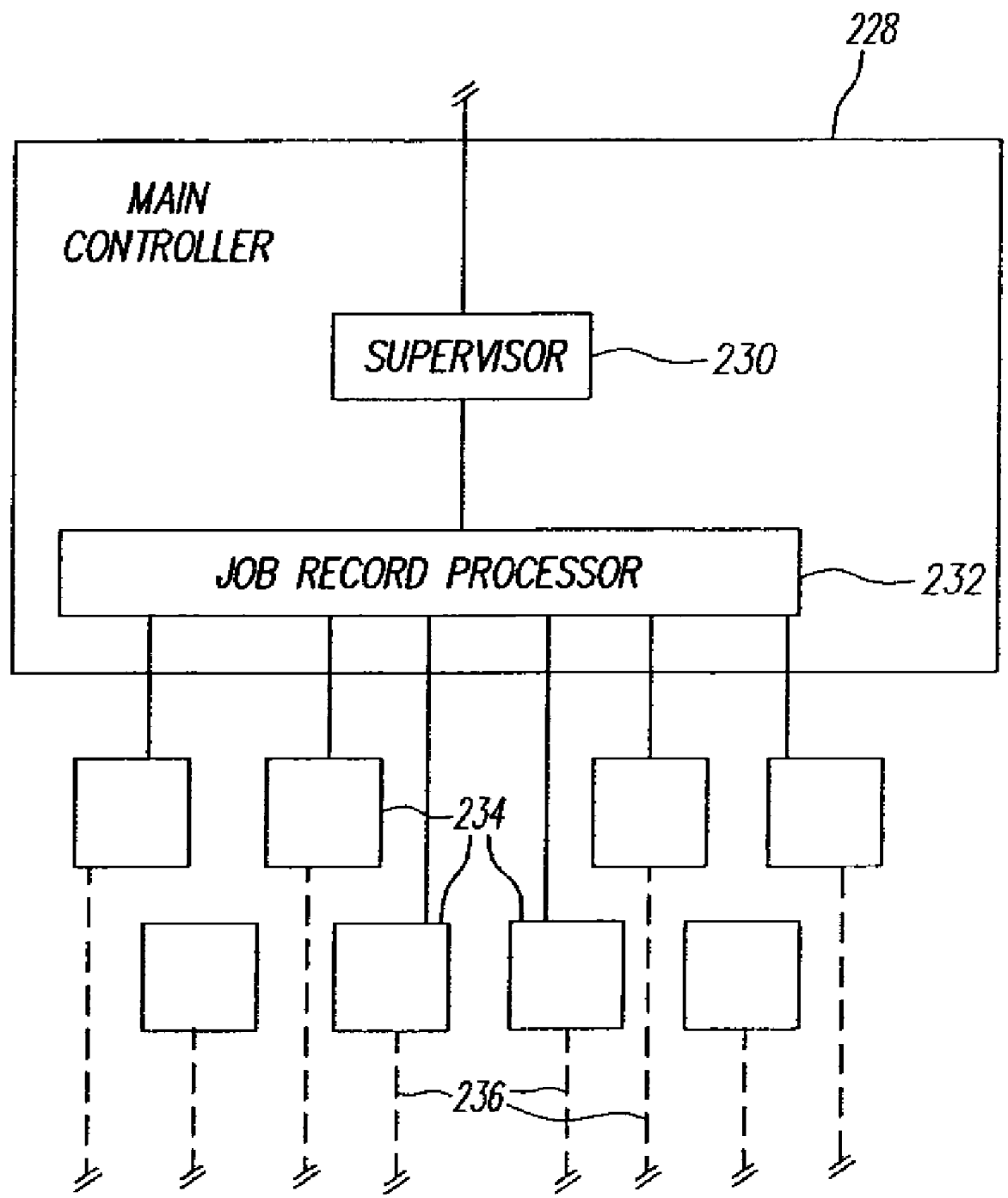
FIG. 2 is a partial detail of the view of FIG. 1 showing the main controller and downstream processors of the data control unit.

Referring to FIGS. 1-2, the main controller 228 has a supervisor 230 that receives the job data and a job record processor 232 that segments the job data and distributes the segments. The segments are each distributed to the appropriate downstream processor 234, which then supplies the printhead 218 required by the data in the respective segment. Signal paths 236 run between the downstream processors 234 and the respective printheads 218. The segments can be distributed to the downstream processors in blocks, which may or may not correspond in size to particular segments. The segmentation and block divisions provided by the job record processor can be as simple as identifying predetermined partitions in the print data or can require extensive computations. Suitable procedures for these purposes are well known to those of skill in the art.

The job record processor 232 also distributes commands necessary for the respective downstream processor and printhead. In a particular embodiment, the job record processor distributes the data to the individual downstream processors via a data bus (item 31 in FIG. 3). A processor buffer 29 can be used to store the segments between the job record processor and the downstream processors. It is convenient if the main controller also handles errors in the input data. Suitable features for this function are well known to those of skill in the art. In addition to distributing the segments, the job record processor processes control parameters (sometimes referred to as "input records"), which apply to the entire job. For example, the job record processor handles the job control record, which is typically the first input record and specifies the job name, number of downstream processors, and the like.

The downstream processors receive the respective segments and convert the commands and data into printable frames compatible with the press. The conversion generally includes raster image processing that is applied to print data in the form of page description language to produce bitmapped frames that are then printed without further modification, but the processing can differ and the printable frames can be subject to further processing before printing. For example, the downstream processors may receive pre-ripped bitmaps and simply convert them into final form ready for output. Each downstream processor supplies printable data to one or more printheads. As with other components discussed herein, the downstream processors can each be provided in the form of software or hardware or a combination of the two. In a particular embodiment, efficiency is improved by including one or more microprocessors in each downstream processor used, with each downstream processor corresponding to one of the segments of a print job. A user interface (not shown) to the downstream processors can be provided, either directly or via the main controller, by which the configuration of the printer or the flow of the data can be set up and/or monitored.

Each downstream processor acknowledges receipt of the print data. The main controller communicates bidirectionally with the individual downstream processors to enable or disable the output, to configure output parameters such as printhead width and the number of pixels in the paper motion direction per encoder pulses from the paper motion encoder and ripping parameters such as maximum frame length for registration cued documents. The main controller also tracks the status of each frame given to the downstream processors, and detects errors from the downstream processors.

In a particular embodiment the functions of the downstream processors are to receive the printing data, parse the header from the print job and determine the printing and finishing requirements of the job, analyze the PDL (page description language) to determine any job or frame requirements that were not stated in the header, resolve any conflicts between the requirements of the job and the marking engine configuration (for example, raster image processing time mismatch resolution), keep accounting record and error logs and provide this information upon request, communicate image transfer requirements to the marking engine, translate the data from PDL (page description language) to raster for printing, and support diagnostics for maintenance and the like. The raster image processor accepts a print job in the form of a page description language (PDL) such as IJPDS, IPDS, Postscript, PDF, or PCL and converts it into a raster or grid of lines or another form that the marking engine can accept.

The processing in the different downstream processors is asynchronous, that is, each downstream processor performs processing of a respective segment in a manner that is not synchronous with the processing of the other segments in the other downstream processors. Processing in different downstream processors in synchrony is not practical, in view of communications delays, the effect of errors and the like, and the fact that processing time, particularly raster image processing, is dependent upon content of the respective segments. The processing of a segment in a downstream processor begins when one or more blocks containing all or, alternatively, part of the segment are received by the downstream processor.

The type of processing performed in the downstream processors can differ between different print jobs provided in a stream of printing data. The number of downstream processors used and the manner of their use (also referred to herein as the "arrangement") is a function of the content of a particular print job. For example, a particular print job might not use a printhead, due to not using the color of ink supplied by that printhead. Similarly, a press could have a pair of four-color, document-wide printheads. A first job might have an arrangement using both for all four colors, and a second job might have an arrangement using one of the two printheads for two of the colors and the other head for the other two.

Each downstream processor can be provided, in memory, with a respective processing or input queue and a respective print or output queue. Printing data in the processing queues is supplied to respective downstream processors as processing capacity becomes available. As with other queues described herein, compression/decompression can be used to reduce queue size (data volume in memory), within applicable time constraints and available processing capabilities.

The print queues supply the printheads. The data usage rate at the printheads varies with the speed of transport of the receiver. In a particular embodiment, shown in FIG. 3, during normal printing, the downstream processor is able to produce bitmaps by raster image processing faster than the bitmaps are printed. A print job 24 is supplied to the supervisor 230, which transfers the data to the job record processor 232. An output control 27 of the main controller 228 communicates bidirectionally with the supervisor 230 and the downstream processors to enable or disable output, to configure output parameters such as printhead width, and frame length.

Figure 3:
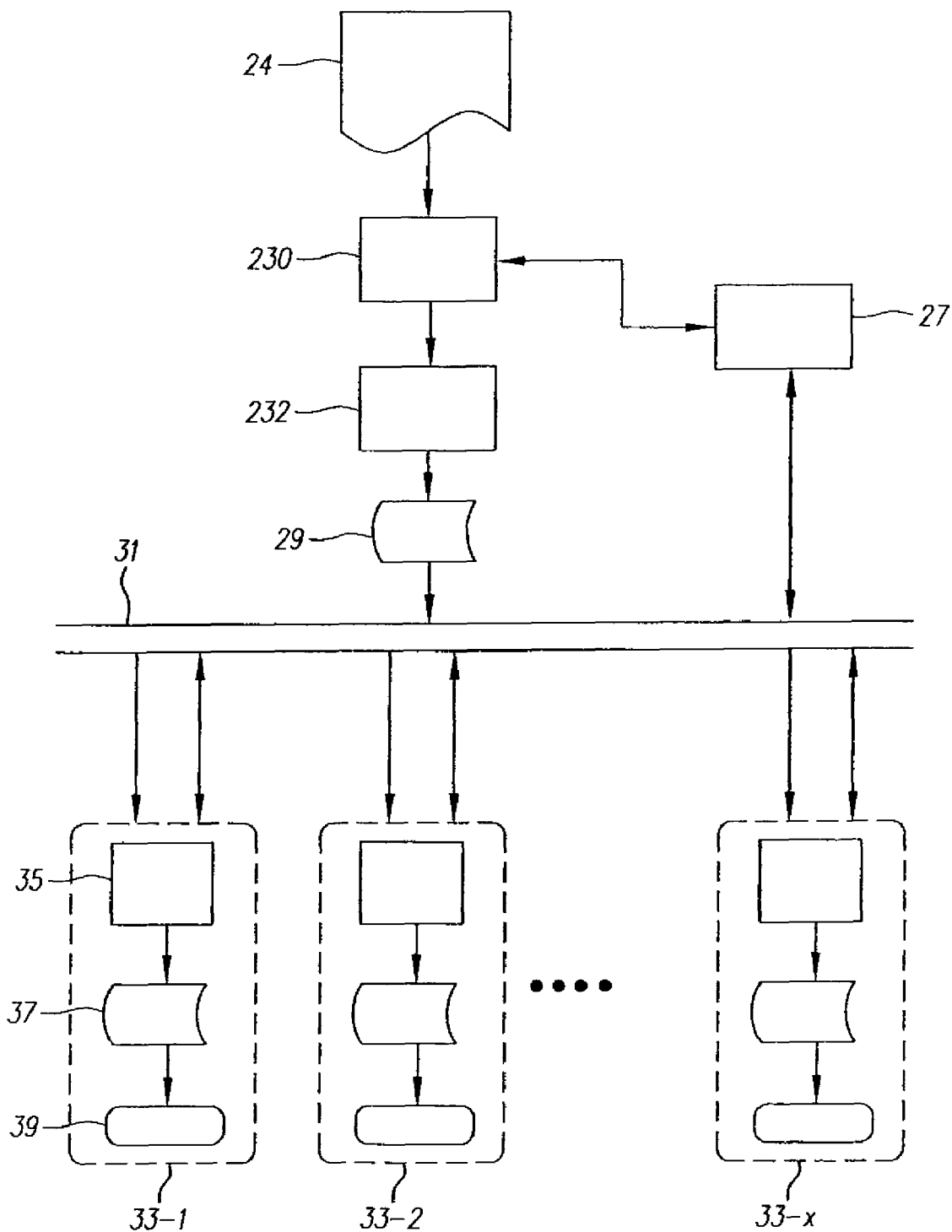
FIG. 3 is a diagram illustrating operation of a specific embodiment of the apparatus of the system of FIG. 1.
Figure 4:
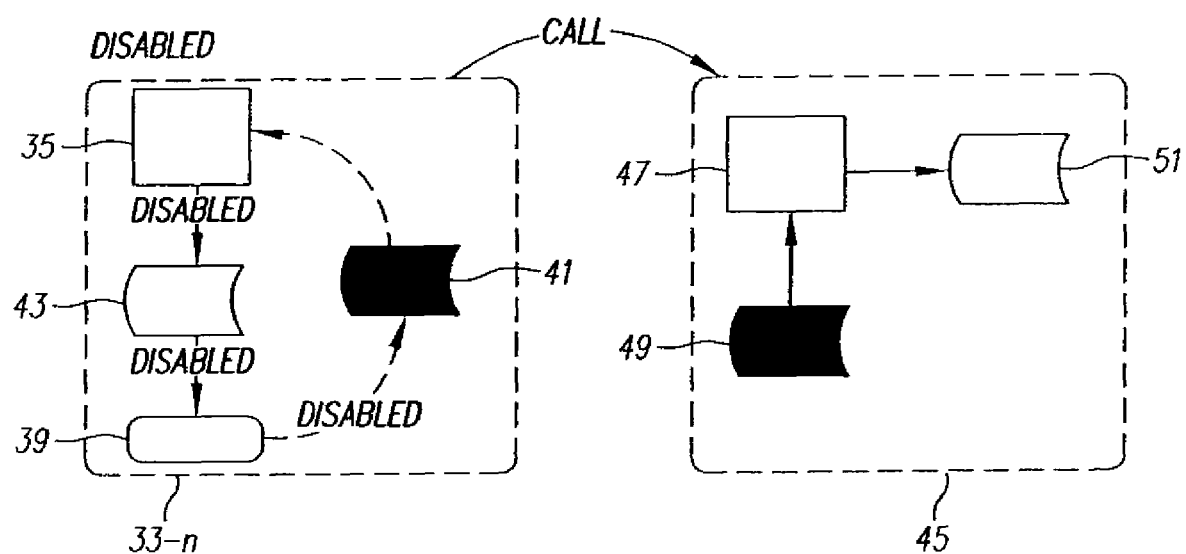
FIG. 4 is a diagram illustrating part of the operation of FIG. 3, as modified in a specific embodiment.

In FIG. 3, components related to supplying bitmapped frames to the printheads are indicated by dashed lines 33-n. The downstream processor 35 converts the image data to a bitmap and supplies the bitmapped frame to the print buffer 37, which provides the bitmapped frame as an output 39 to the appropriate printing module controlling the respective printhead. FIG. 4 shows these steps in more detail. The downstream processor 35 creates a bitmapped frame, takes an empty unit of memory from a free frame store 41, fills the empty memory unit with the bitmapped frame, and assigns the filled memory unit to the print queue 43. The printhead prints the bitmapped frames in the print queue and then the respective memory units are returned to the free frame store, which can be actual memory dedicated to this use or virtual memory made available as needed.

The supplied bitmapped frames are printed by the printheads of the press. In a particular embodiment, the system has continuous ink jet printheads, in which each print head defines one or more rows of orifices which receive an electrically conductive recording fluid, such as water based ink, from a pressurized fluid supply manifold and eject the fluid in rows of parallel streams. Printers using such print heads and print engines accomplish graphic reproduction by selectively charging and deflecting the drops in each of the streams and depositing at least some of the drops on a print receiving medium, while others of the drops strike a drop catcher device. The present invention is not limited to any specific image transfer process or receiver type, but can be applied to any high speed printing system including sheet-fed systems. In a particular embodiment, the press is capable of printing a single color A4 page up through two full across, duplex A4 pages in full cyan, magenta, yellow, and black process color.

The bitmapped frames are received from respective print queues, by print modules. Each print module is an output driver that drives the one or more printheads that print the respective frames. Print modules are conveniently provided in the press, but like other components of the system, can be located separately or combined with other components.

The press has a transport unit that transports the receiver along a path past the printheads. In particular embodiments, the transport is continuous during the various steps of preparing and printing the document or documents of the print data. The printheads are sequentially arranged relative to the transport path, such that the printheads sequentially mark the receiver, adding respective printable frames in registry to provide a printed output having one or more documents.

Suitable apparatus for use as the transport unit is well known to those of skill in the art. In a particular embodiment, the receiver is a paper web and the transport unit has a transport controller, a receiver supply, a receiver collector, a drive, and a plurality of support members. The transport controller is a programmable logic controller. The receiver supply is a core that holds a spool of the paper web. The receiver collector is a mandrel that is driven by the drive. The support members include a plurality of rollers positioned to bear the web. Other types of support members, such as skis and bars, could be substituted for one or more of the rollers. The core and one or more of the support members can also be driven.

The receiver collector can collect the web in a roll, can use any suitable post print peripheral such as a folder or cutter, or can feed a production line for more complete finishing.

The main controller of the press includes a printing manager that monitors and controls the electromechanical aspects of the press, including image formation with the printheads and transport of the receiver. The printing manager can be included within the printer or as all or part of a separate component. Appropriate sensors such as mechanical, electrical, or optical sensors can be utilized to check the status of different aspects of the system. For example, such sensors can be located along the transport path of the receiver and can be associated with the printheads. Based on such signals and a suitable program the printing manager can control the operation of the press. Suitable procedures and equipment for this purpose are known to those of skill in the art.

In particular embodiments, the press includes a registration unit having one or more registration cue sensors that detect the location of registration marks or cues. That location information is then used to register the output of one or more printheads. Suitable techniques and equipment for this purpose is disclosed in U.S. Published Patent Application No. US2003/0234959A1, which is hereby incorporated herein by reference. Misregistration between different frames of a document, at least on the same document surface, is very noticeable. For that reason, in some embodiments the registration cues are printed by the printheads producing one or more of the frames of a document and are then used to register one or more frames printed later in the sequence for that document. Additional registration features can be provided on the receiver or otherwise, to track receiver location and travel for use in defining a location of the document on the receiver.

The respective segments are transferred in registered relationship to the receiver as the receiver is transported serially from printhead to printhead, receiving at each printhead a respective frame of a document. The printheads operate in parallel, that is, different printheads print at the same time. Printheads can be located such that two or more different printheads print the same document, that is the same composite page, simultaneously or all printheads can print different documents simultaneously. It will be appreciated that the timing of printing to the receiver is such that proper transfer of images are made so that respective images are transferred in register and as expected. Adjustments of transport speed can be made on a continuous or stepped ramp.

Job Startup Control

Referring now to FIG. 1, in the press, there is a considerable distance measured along the transport path between the first printhead and the last printhead. As a result, the first printhead can print frames of a large number of documents before the first such document arrives at the last printhead, which prints one of the frames on the second side of the document. Similarly, at the end of a print job, printhead stops printing long before printhead does. This becomes more complicated when the printing data includes multiple print jobs, which can use different numbers and arrangements of printheads. Problems can occur if consecutive print jobs have different printhead configurations. Since the printheads are spread along the web, the printheads may or may not printing the same document at any given time. Normally, all the data for a frame comes into the main controller at the same time. As a result, the printheads that print later have to be buffered by more data. With more complex documents, one or more printable frames may not yet be processed, while other frames of the same document are being delivered from respective print queues for printing. When the printing data is a stream of print jobs, the next job in the stream can be begun when a downstream processor and associated print queue become available. This approach can be problematic.

Processing the next print job when only a first downstream processor is ready requires measures to prevent damage to the unfinished print job. Print queues and processing in downstream processors for a first job would have to be isolated from the second job to prevent the two print jobs from running together. A great many fonts are available for use in print jobs. On the other hand, most print jobs only use a small number of fonts. In the system, fonts are associated with a print job and not with individual documents or frames. The main controller upon receiving a print job, loads required fonts into a font store in memory. The font store is accessible by all of the downstream processors and the fonts are used during raster image processing or the like. Fonts can be unloaded when no longer required. The usage of fonts in common for each print job greatly reduces required memory space for the fonts, but makes processing the next print job, when only a first downstream processor is ready, problematic. If the second print job has different fonts, then there is a risk that the fonts used for the first print job will be changed or deleted, while still needed for raster image processing the first print job.

Figure 6:
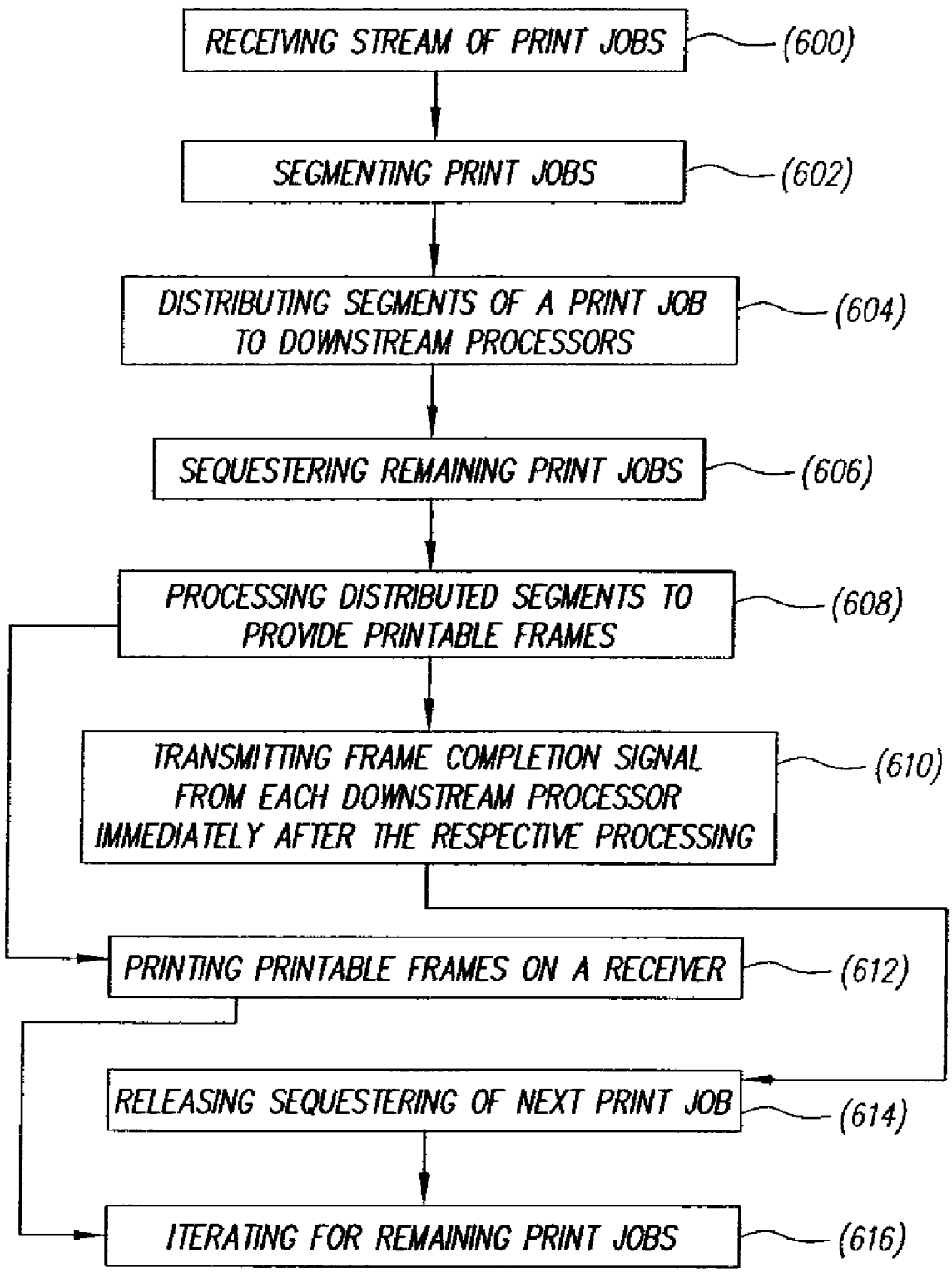
FIG. 6 is a diagram of an embodiment of a job startup control method.

FIG. 6 shows an embodiment of the methods described herein that provides job startup control to resolve these issues. A stream of print jobs is received (600) at the main controller. The print jobs are segmented (602). This can occur one-by-one as needed, or otherwise as convenient. Segments of one of a stream of print jobs are distributed (604) to a plurality of downstream processors. The downstream processors may or may not be all of the available downstream processors, depending upon the content of the print job. Each of the downstream processors receives one of the segments and supplies a respective one or more of the printheads. The remaining print jobs of the stream are sequestered (606), that is, remaining print jobs are set aside, and while set aside are not processed by the downstream processors.

The distributed segments are processed (608) in the downstream processors to provide respective printable frames, which are sent to the respective printing module and printed (612) with the associated printheads. The processing in different downstream processors is asynchronous and dependent upon content of the respective segments. Each downstream processor, immediately after processing a segment, transmits (610) a frame completion signal to the main controller. When the main controller determines that the frame completion signals have been transmitted by all of the plurality of downstream processors used by the print job, then the sequestering of the next print job of the stream is released (614). This process is repeated (616) for each of the jobs in the stream. The number of segments and the number of downstream processors may differ in each iteration.

In a particular embodiment, the printing of a print job is independent of the transmitting of the frame completion signals of that print job. This has the advantage of simplifying queuing in the print queues.

Sequestration can occur before, during or after the operations performed by the main controller or in some combination. For example, sequestered print jobs can be in the form of segments or can be unsegmented. In the former case, the input queue can precede or follow distribution of the segments. In the latter case, the sequestered print jobs are unsegmented and not yet distributed. Intermediate approaches are possible. The sequested print jobs are held in an input queue, which can be provided as physical units of memory or as a logical structure that makes the sequence of sequestered print jobs available when needed.

In a particular embodiment, the main controller loads necessary fonts as a part of distributing segments of a print job. The main controller unloads other fonts. The sequestering also blocks unloading of the loaded fonts of the print job preceding the sequestered print job. The releasing allows unloading of the loaded fonts. When unloading of fonts is blocked, a message can be provided to an operator indicating that blocking and allowing the operator to override the block. Font unloading can also be blocked or allowed based on other parameters, such as the output state of a sensor in finishing equipment on-line with the press. Such blocking and allowing can be additive of the blocking and allowing based on sequestration.

Printing by the different printheads can be synchronized, but it is expected that, in most cases, printing of some or all of the printheads is in temporal asynchrony. In other words, the printing of different frames by such printheads is not synchronized. This results from differences in the content printed by the different printheads, but may also be due to other factors. In some cases, the receiver does not have a constant relationship to the different printheads so as to automatically synchronize the positioning of the document for printing by each of the printheads. For example, as discussed elsewhere herein, the web receiver may be subject to stretching during printing. With cut-sheet receivers, one or more sheets can be delayed during transport. For example, a transport path that includes a drum that ordinarily carries the sheets for a single revolution can be modified to carry the sheets on the drum for multiple revolutions. The same effect can be provided by moving sheets in and out of a temporary storage bin.

Figure 5:
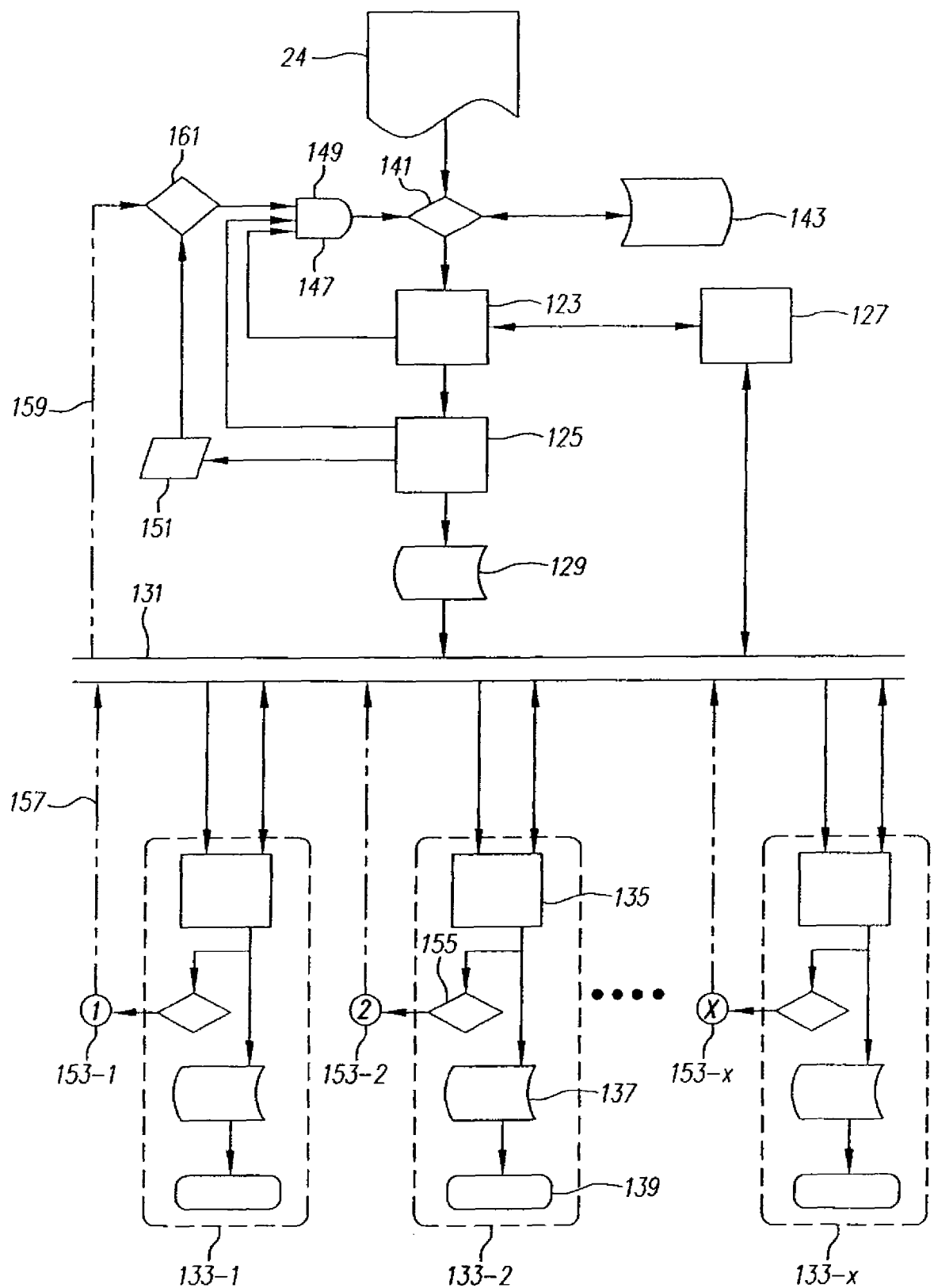
FIG. 5 is a diagram illustrating operation of another specific embodiment of the apparatus of the system of FIG. 1.

FIG. 5 illustrates a specific embodiment of an implementation of a system that provides job startup control. A stream of print data is received by the supervisor of the main controller. In the supervisor, a queue control unit 141 passes a print job 24 of the stream to a primary unit 123 or transfers the print job to the input queue 143, in response to a ready or not ready signal supplied to port 147 that indicates whether the downstream processors are still processing the previous print job or are ready for the next print job. The primary unit 123 accepts the print job data from the queue control unit 141 until it encounters a start of job statement, which indicates the start of a second print job. At this point, it outputs a logic level low signal to an AND gate 149, driving its output port 147 low. This causes the queue control unit 141 to stop the transfer of print data at the end of the first print job. The primary unit 123 transfers the first print job to the job record processor 125.

The job record processor 125 identifies which downstream processors 133-1 through 133-x will be used to process the print job. The job record processor stores a tally of the downstream processors utilized for that print job, in tally memory 151. The job record processor 125 then segments the print job and distributes the segments to respective downstream processors 133 via a data bus 131. When the segments of the print job have been distributed, the job record processor sends a distribution completion signal to completion determination unit 149 of the main controller. The primary unit 123 can also send a completion signal, if desired. This signal is redundant of the distribution completion signal, but may be useful in isolating errors. The completion determination unit 149 is shown and described as an AND gate. It will be understood that the specific logic used in implementing these and other features can be modified, as is well known to those of skill in the art.

The processor buffer 129 can store the distributed segments between the record processor 125 and the downstream processors 135 until needed. In each downstream processor 133, the respective segment is raster image processed, converting the print data into a bitmapped frame. Print buffers 137 hold the respective bitmapped frames until the frames can be output 139 and transferred to the respective printing module.

Each downstream processor 133 is capable of producing a job complete signal 153, to indicate whether the downstream processor is processing the print job or has completed processing. The job completion signals 151-1 through 151-$x$ are supplied via links 157 and 159 to job completion tester 161 in the main controller. The job completion tester 161 compares the job completion signals from the downstream processors with the tally stored in tally memory 151. The job completion tester outputs a logic level high when a job completion signal has been received from each of the downstream processors in the tally and otherwise provides a logic level low. FIG. 5 shows the job completion signal 153 as being derived by a decision block 155. It will be recognized that there are numerous methods by which the job completion signal 153 can be derived, including but not limited to if-then conditional tests or subroutines called upon encountering an end of job reference in the data stream.

By the time the job completion tester 161 outputs a logic level high, the main controller 123 and the job record processor 125 will have already completed processing of the print job and will have changed their output signal to the AND gate 149 to high. With all inputs to the AND gate 149 at logic level high, the AND gate 149 outputs a logic level high, which enables the queue control 120 to start transferring data from the input queue 122 for the next print job to the primary unit 123 to start the processing of the next print job.

Fast Job Halt

In the press of FIG. 1, there is a consider distance between the first printhead and the last printhead and as a result, the first printhead prints a large number of documents before the first such document arrives at the last printhead and, at the end of a print job, the first printhead stops printing long before the last printhead stops printing. With high speed printing, the print queues need to be large. This is particularly the case for high speed web fed presses, since a large amount of inertia is associated with moving the web through the press at high print speeds. These presses cannot quickly stop and restart the motion of the receiver. For example, in some presses, it can take thirty seconds to slow a web down from 300 m/sec to 60 m/sec in a controlled manner. This requires the data processing speed to be very fast, and mandates that there be some amount of data ready for printing stored in a buffer should there be a momentary delay in processing the data.

In a data system that allows print jobs to be queued up to print one after another without stopping the printer, the need to store print ready data in buffers increases. This is due to several constraints on the data system. There are overhead tasks to be completed at the start of some print jobs before print data can be processed by the downstream processors. One print job may not use the same fonts as the preceding print job. The fonts must be loaded before the print job can be raster image processed. This may necessitate unloading earlier loaded fonts. The overhead tasks add time and, thus, increase print queue sizes. An additional constraint is imposed if the above-described job startup control is used. In that case, a first job must be completely bitmapped by all the downstream processors and the bitmapped frames stored in print queues ready to output to the printheads, before the main controller can start to process the second print job. If the transport path of a web press between the first and last printhead is about 60 feet (about 18 meters) long, there is about a 3.6 second delay between printing with the first and last printheads, when printing at high speed of about 1000 ft/min (about 300 m/min). The print queue for the first printhead must therefore have data for at least 60 feet of print to keep from running out of data.

Due to these various requirements, a considerable amount of bitmapped data must be stored in the print queues to prevent the press from running out of bitmapped data before the bitmapped data for the second print job is available. In a particular embodiment, the print queues hold enough bitmapped frames for 200 feet of printing for each of eight printheads in the system. This requires about 12 GB of memory. As the print speed, number of printheads used, width of a printhead, or the resolution of the printheads increase, the sizes of the print queues are further increased.

Figure 7:
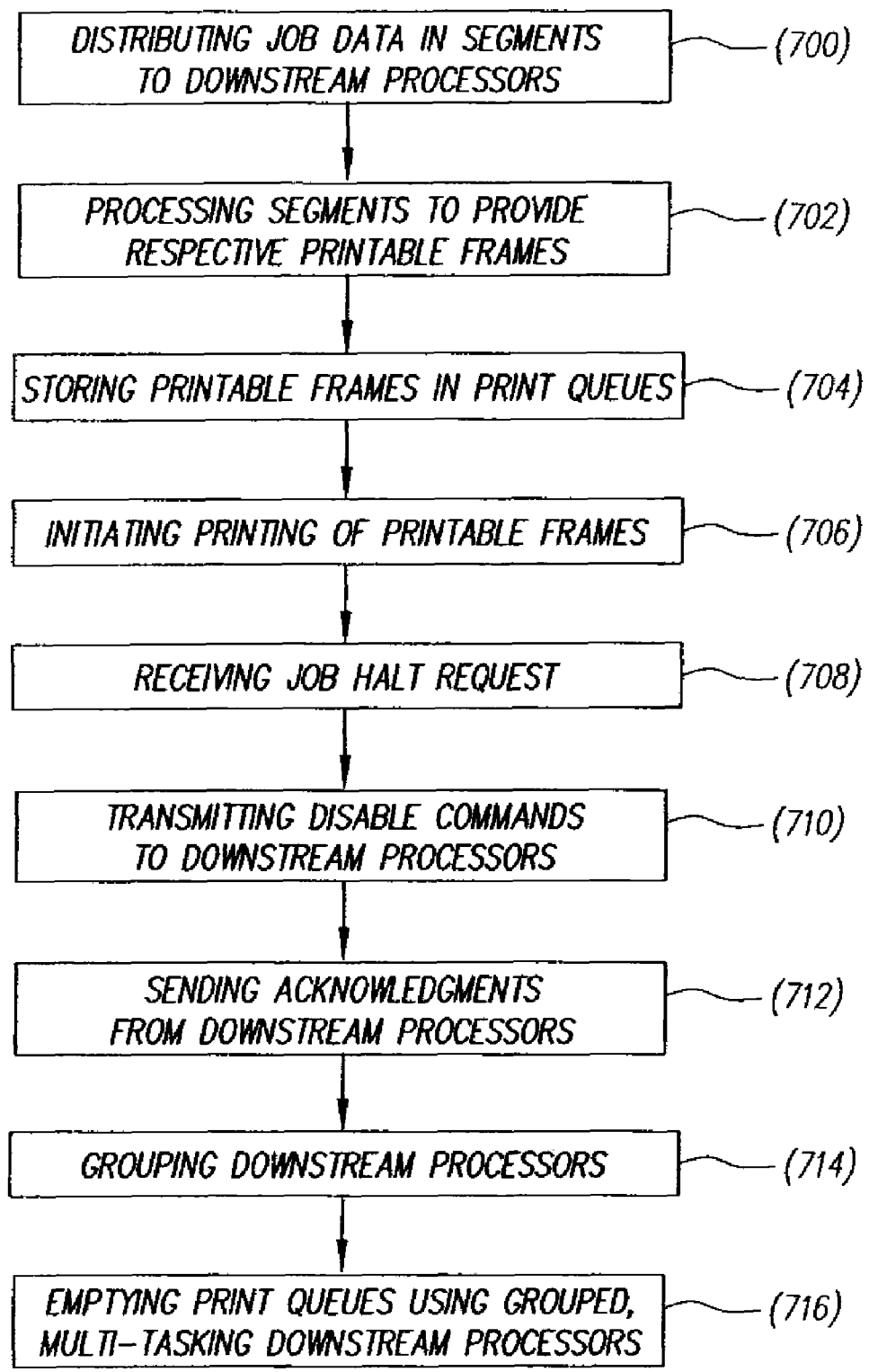
FIG. 7 is a diagram of an embodiment of a fast job halt method.

Management of the large amounts of buffer memory required for the print buffers can become problematic. A particular problem is halting a current print job and quickly preparing for printing another print job or reprinting the current job under different conditions. FIG. 7 is an implementation of an embodiment of the methods described herein, directed to resolving this problem. In this embodiment, a stream of job data is received (not shown) in the main controller and a first print job in the stream is segmented (not shown) and distributed (700), as earlier described, to a plurality of downstream processors. The segments are processed (702) and the resulting printable frames are stored (704) in respective print queues. Printing of the first print job is initiated (706). Prior to completion of the printing, a job halt request is received (708) in the main controller. The job halt request can be entered by a user via the user interface or can be generated by a component of the system, independent of the main controller. For example, a sensor could generate a job halt request when a reservoir of a special ink required for the first print job was empty.

The main controller transmits (710) disable commands to the downstream processors responsive to the job halt request. The downstream processors each receive a disable command, stop processing, and send (712) an acknowledgement of the respective disable command to the main controller. The disable commands can be transmitted in one or more groups or individually.

In a particular embodiment, the transmitting of the disable commands and the sending of the acknowledgements is sequential. A first disable command is output to a first of the downstream processors, which stops processing the respective segment and returns an acknowledgement. After receiving that acknowledgement, the main controller, in response then sends a disable command to the next downstream processor, which stops processing and sends an acknowledgement. The process iterates for the remaining downstream processors.

It is currently preferred that the disable commands are only sent to the plurality of downstream processors used in processing the current print job. Disable commands could also be sent to downstream processors not used in the current print job, but such commands and corresponding acknowledgements would be superfluous, except as a convenience, for example, in providing a count of available downstream processors.

The main controller groups (714) the downstream processors as they stop processing and become available into one or more groups. Downstream processors not used in the current print job are also grouped. Each group is tasked with emptying one or more of the print queues associated with the grouped downstream processors. The downstream processors multi-task to empty (716) those print queues. As available, more than one downstream processor empties the same print queue. Print queues can be emptied one-by-one or multiple print queues can be emptied at the same time. When each acknowledgement is received, another downstream processor is available for use in emptying the print queues and another print queue is available for emptying. The number of downstream processors doing the emptying increases as more acknowledgements are received. Downstream processors can be assigned to a single group, which empties print queues one by one or multiple groups can be created to empty multiple print queues concurrently. The downstream processors can be assigned and reassigned between groups as available and as needed based on priorities.

Once the print queues are empty, the main controller distributes segments of the next print job, which is then printed as earlier described. In embodiments in which the receiver is a web, the transport of the web is independent of the job halt request and the disable commands and is uninterrupted during the steps of the method.

In a particular embodiment, when the downstream processor 33-n receives a disable command from the main controller, the downstream processor immediately stops creating any more bitmapped data and outputting any more data, as shown in FIG. 5. The downstream processor calls for the creation of a helper task 45. In the helper task 45, available downstream processors 47 clear memory units 49 of print queues 43, and place the cleared memory units 51 in a store of available memory.

Multi-Head Press Data Delivery Rate Control

In high speed and very high speed printing, a continuing problem is supplying data at a rate sufficiently matched to the print engine. Communication bandwidth can be limiting, but the greatest constraint tends to be processing, such as raster image processing, in one or more downstream processors. This processing is generally limited by the content of the data stream. One approach to solving this problem is pausing transport of a receiver through a path until data is available. This approach can be practical with a cut-sheet receiver, but is problematic with a receiver in the form of a web, particularly at high rates of transport. Another approach is to restriction how a print job is input, such that the data rendering process can ensure that frames can be converted into printable bitmaps at the full rated speed of the printing system. For example, provision of pre-ripped images to downstream processors can be required. This is workable, but greatly encumbers the making any last minute changes. U.S. Pat. No. 6,762, 855, which is hereby incorporated by reference, discloses a system that uses buffer management logic to adjust transport speed on a per-document basis. Control buffers accumulate slack time left over from raster image processing non-complex documents and then allocate that slack time to complex documents to optimize average raster image processing time with the speed of the print engine. This patent does not address controlling delivery of data from multiple, queued print jobs to prevent a later print job from damaging an earlier unfinished print job.

Figure 8:
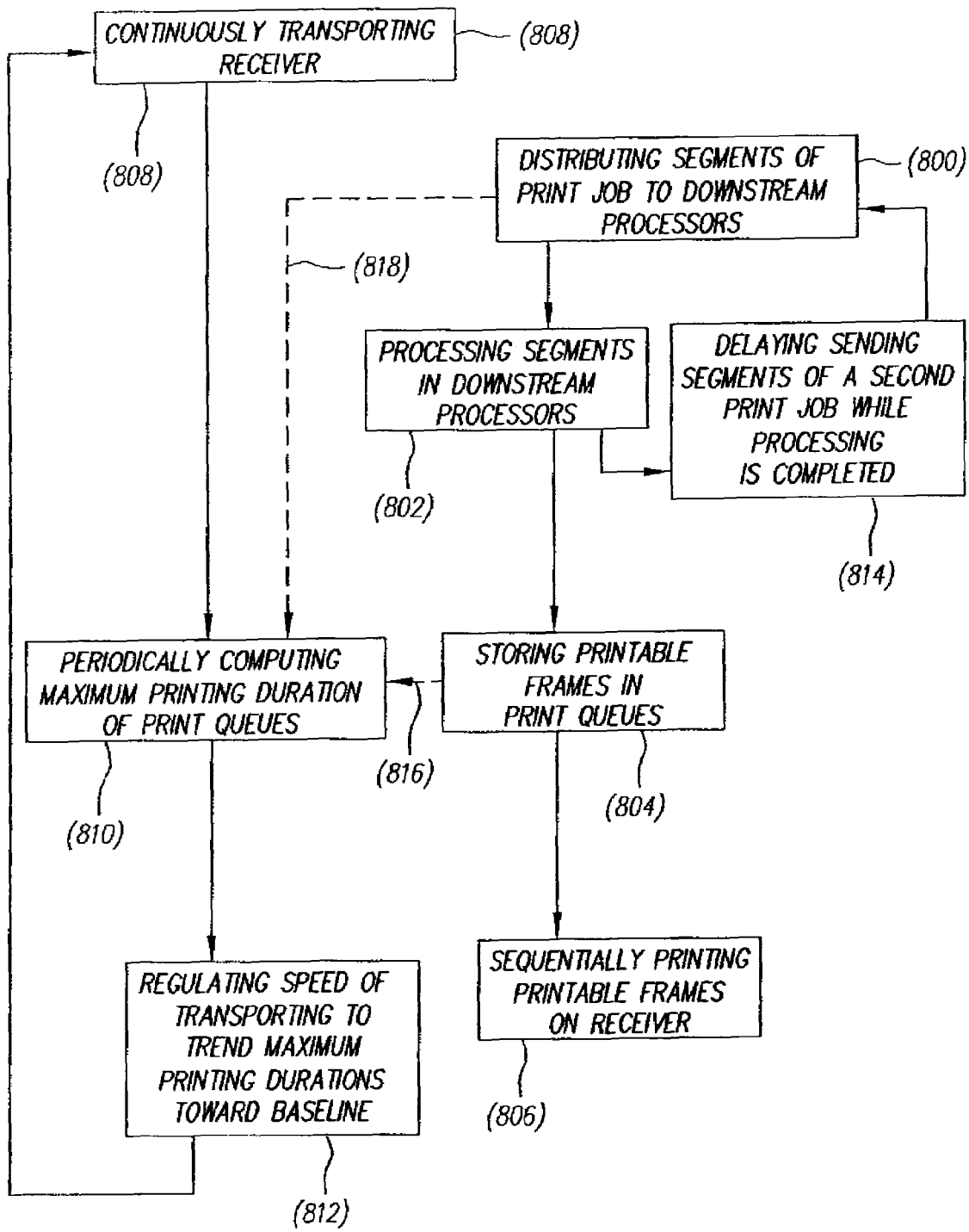
FIG. 8 is a diagram of an embodiment of a data delivery rate control method.

A particular embodiment addresses the issue of data delivery management with multiple, queued print jobs. Referring now to FIG. 8, in a particular embodiment, a stream of print jobs is received (not shown) and segmented (not shown), the segments of a first print job in the stream are distributed (800) to each of a plurality of downstream processors and are processed (802) to provide respective printable frames, which are then stored (804) in the individual print queues. The printable frames are sequentially printed (806) from the print queues on a continuously transported (808) receiver, such as a web. More detailed aspects of these features are as earlier discussed.

In this embodiment, a maximum printing duration of the print queues is periodically computed (810) during the printing of the first print job and the transport speed of the receiver is regulated (812) to trend the maximum printing durations toward a predetermined baseline. The sending of segments of a second print job in the stream to the downstream processors is delayed (814), while the processing of respective segments of the first print job is completed by the downstream processors. This delaying is counter to the regulating, since the delaying reduces the print queues of the first print job non-uniformly relative to the baseline.

The maximum printing durations are each computed by first estimating a printing duration of each of the print queues. Each printing duration represents a period of time needed to process and/or print the respective printing frames. It is preferred that printing durations look ahead, such that time is available to start ramping the transport speed. A printing duration is estimated for a unit of printable frames. The unit can be a document, a number of printable frames, or the content of a print queue.

Each of the printing durations includes a usage time that represents the required time for completion of printing of the respective unit of printable frames. At least one of the printing durations includes slack time. This is a difference in usage times between two or more of the units. After the printing durations are estimated, slack time of one or more of the printing durations is reallocated between units and the maximum of the printing durations is then ascertained. Units can be paired or otherwise considered in any convenient manner for estimating slack times and reallocating. For example, highest printing duration can be paired with lowest, and then next highest and next lowest, and so on.

The reallocating can be within individual print queues or between one or more print queues or both. In reallocating between print queues, resources are also reassigned. In a particular embodiment, one or more microprocessors are reassigned between respective downstream processors along with reallocated slack time.

The transport speed is regulated based on a difference between a computed maximum printing duration and a baseline that is predetermined for a particular printing system. The baseline can be a constant percentage of maximum queue capacity or can be more complex. For example, the baseline can vary to account for start-up of components. Changes in transport speed can be designated at each computation of a maximum printing duration. In particular embodiments, each change specifies a ramp of speeds having a trend of approaching the baseline. Because of the reallocations, the average transport speed of a print job is likely to be increased, by decreasing the time spent ramping up and down.

Delaying sending the second print job results in the individual print queues emptying one after another in an order based on the sequence order and relative positions of the respective printheads along the transport path and on any other variation in printing durations between respective print queues. The emptying of the print queues is non-uniform in terms of printing duration, that is, relative to the baseline. The print queues empty as printable frames are printed, but those frames can vary greatly in printing duration. The delaying makes the regulating of the transport speed less effective, since less allocating can occur as less print queues hold printable frames.

In a particular embodiment, the processing of the second print job is also delayed by the loading of fonts for the second print job and, to the extent necessary, the unloading of fonts from the first print job. The time and resources spent loading and unloading fonts are not available for loading the second print job.

In addition to any effects of the delaying on the speed of the transporter, the main controller also tracks the completion status of the print jobs and, if necessary, further slows the rate of receiver transport, as the first print job approaches and reaches completion. The slower rate provides the time necessary to refill the print queues when the second print job is started.

Printing durations can be based on the size of print queues, but this in not preferred, since it does not take into account changes in printing time resulting from changes in image content. Depending upon the press, it may be necessary to consider printable frame content to prevent errors, such as stitching and registration defects. There can also be other print job requirements not directly related to the printable content that change required printing time, such as operating parameters that impose speed limitations. For example, use of a sorter in a finishing device may require an additional control sequence. European Patent Application EP0863003 and U.S. Pat. No. 6,318,833 discussed some of the operating parameters that control ink jet printing.

In a particular embodiment, the printing durations and resulting transport speeds are based on a consideration of both predicted accumulation of printable frames (indicated by dashed arrow 816 in FIG. 8) and printing requirements of the printable frames (indicated by dashed arrow 818 in FIG. 8). In this case, the printing requirements of each of the segments are ascertained prior to or at the time of estimating printing duration. The accumulation of printable frames in each of the print queues is also predicted. The periodic estimates consider both factors. The predicted accumulations "look ahead" to consider upstream factors, such as the content of upstream queues, such as respective processing queues and whether the document is still being received by the main controller.

The printing requirements include both printable content of the respective frames and non-image requirements. Printable content is the image to be printed on respective frame. The image to be printed can affect transport speed in a variety of ways. For example, with ink jet heads, time for absorption into the receiver and/or partial or complete drying can limit transport speeds differently between a fully printed document and a document printed in only a small percentage of the printing elements.

Non-image requirements relate to how the content is printed and to the physical dimensions of the document. (This is typically a variation between documents and/or print jobs in the direction of travel, but is not limited to just that dimension.) Specific examples of non-image requirements include the number of printheads used, the usage configuration of the printheads, and resolution of the printheads. The usage configuration of the printheads includes the arrangement of printheads used and the arrangement of marking elements (for example, ink nozzles in an ink jet printhead) within those printheads. Physical length of the document can be a function of receiver transport or can be defined by the spacings of two or more registration cues. In the latter case, the time required for the press to recognize and register to the registration cues can place a limit on transport speed.

Different print jobs tend to have different content and, thus, different content-related printing requirements. Different print jobs in a stream of print jobs and different documents within each of those print jobs can have different non-image requirements. With large separation of printheads along the transport path, two or more of the print queues can contain printable frames of different documents of the print job or from different print jobs. In those cases, the estimated maximum printing durations periodically determined are each across multiple documents, rather than representing different printable frames of the same document. Suitable periods for iterating the estimates can be determined heuristically based on printing experience with similar jobs. A single estimate predicting an entire print job would be undesirable, since the variable overlap of the different documents or different jobs in the print queues during printing would make such a prediction complex. A single estimate would also be unable to account for actual variations in time requirements during the process, such as time to recognize and apply a registration cue.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

In the following description, some features are described as "software" or "software programs". Those skilled in the art will recognize that the equivalent of such software can also be readily constructed in hardware. Because image manipulation algorithms and systems are well known, the present description emphasizes algorithms and features forming part of, or cooperating more directly with, the method. General features of the types of computerized systems discussed herein are well known, and the present description is generally limited to those aspects directly related to the method of the invention. Other aspects of such algorithms and apparatus, and hardware and/or software for producing and otherwise processing the image signals involved therewith, not specifically shown or described herein may be selected from such systems, algorithms, components, and elements known in the art. Given the description as set forth herein, all additional software/hardware implementation is conventional and within the ordinary skill in the art.

It should also be noted that the present invention can be implemented in a combination of software and/or hardware and is not limited to devices, which are physically connected and/or located within the same physical location. One or more of the components illustrated in the figures can be located remotely and can be connected via a network. One or more of the components can be connected wirelessly, such as by a radio-frequency link, either directly or via a network.

It will be understood that the circuits shown and described can be modified in a variety of ways well known to those of skill in the art. It will also be understood that the various features described here in terms of physical circuits can be alternatively provided as firmware or software functions or a combination of the two. Likewise, components illustrated as separate units herein may be conveniently combined or shared. Multiple components can be provided in distributed locations.

In each context, the invention may stand alone or may be a component of a larger system solution. Furthermore, human interfaces, e.g., the scanning or input, the digital processing, the display to a user, the input of user requests or processing instructions (if needed), the output, can each be on the same or different devices and physical locations, and communication between the devices and locations can be via public or private network connections, or media based communication. Where consistent with the disclosure of the present invention, the method of the invention can be fully automatic, may have user input (be fully or partially manual), may have user or operator review to accept/reject the result, or may be assisted by metadata additional to that elsewhere discussed (such metadata that may be user supplied, supplied by a measuring device, or determined by an algorithm). Moreover, the methods may interface with a variety of workflow user interface schemes.

The invention has been described in detail with particular reference to certain preferred embodiments thereof, but it will be understood that variations and modifications can be effected within the spirit and scope of the invention.

The invention claimed is:

1. A fast job halt method for a high speed press having a plurality of printheads, the method comprising the steps of:
    distributing job data in segments to a plurality of downstream processors;
    processing said segments in respective said downstream processors to provide respective printable frames;
    storing said printable frames of each of said segments in one of a plurality of print queues, each said print queue supplying a respective one or more of said printheads;
    initiating printing of said printable frames;
    prior to completion of said printing, receiving a job halt request;
    transmitting disable commands to said downstream processors responsive to said job halt request;
    sending acknowledgements of respective said disable commands from said downstream processors;
    grouping said downstream processors into one or more groups following the sending of respective said acknowledgements; and
    emptying said print queues using said grouped downstream processors, said emptying being multi-tasked between said grouped downstream processors.

2. The method of claim 1 wherein said emptying is concurrent among two or more of said print queues.

3. The method of claim 1 wherein said distributing further comprises excluding said segments from one or more downstream processors additional to said plurality to provide unused processors and said grouping further comprises grouping said unused processors into said one or more groups.

4. The method of claim 1 wherein said printheads are sequentially arranged relative to a transport path and said printing further comprises transporting said receiver along said transport path and using each of said plurality of printheads to sequentially mark said receiver to provide a printed output having one or more documents, said sequential marking of each said document adding respective said printable frames in registry.

5. The method of claim 4 wherein said receiver is a web and said method further comprises continuously transporting said web past said printheads during said transmitting, sending, grouping, and emptying.

6. The method of claim 1 wherein said printing further comprises marking a web and said method further comprises:
    following said emptying, repeating said distributing, processing, storing, and initiating printing; and
    transporting said web continuously throughout said distributing, processing, storing, initiating printing, and repeating.

7. The method of claim 6 further comprising:
    signaling when said groups have emptied said queues;
    delaying said repeating of at least said processing, said storing, and said initiating printing, pending said signaling.

8. The method of claim 1 wherein said job data includes a plurality of print jobs and said method further comprises:
    receiving said print jobs; and
    segmenting each of said print jobs into said segments of job data.

9. The method of claim 1 wherein each of said downstream processors includes one or more microprocessors and said grouping groups said microprocessors.

10. The method of claim 1 wherein said transmitting and sending further comprise:
    outputting a first said disable command to a first of said downstream processors;
    returning a first said acknowledgement of said disable command from said first downstream processor;
    repeating, in series, said outputting and returning steps with each of the remaining said downstream processors.

11. The method of claim 10 wherein said print queues are each supplied by a respective one of said downstream processors and said emptying clears each of said print queues following the grouping of the respective said downstream processor.

12. The method of claim 1 wherein said processing includes raster image processing, said printable data is bit-mapped frames.

13. A fast job halt method for a high speed press having a plurality of printheads, the method comprising the steps of:
    transporting a web past the printheads, said transporting being continuous;
    during said continuous transporting:
    (a) distributing job data in segments to a plurality of downstream processors;
    (b) raster image processing said segments in respective said downstream processors to provide respective printable frames;
    (c) storing said printable frames of each of said segments in one of a plurality of print queues, each said print queue supplying a respective one of said printheads;
    (d) initiating printing of said printable frames using said printheads to mark said web;
    (e) prior to completion of said printing, receiving a job halt request;
    (f) transmitting disable commands to said downstream processors, responsive to said job halt request;
    (g) sending acknowledgements of respective said disable commands from said downstream processors;
    (h) grouping each of said downstream processors into one or more groups, following the sending of respective said acknowledgements;
    (i) emptying said print queues using said grouped downstream processors, said emptying being multi-tasked between said downstream processors; and
    (j) following said emptying, repeating said distributing, raster image processing, storing, and initiating printing.

14. A printing system comprising:
    one or more input units, a main controller, a plurality of downstream processors, a press, and a printable receiver;
    said press having a transport unit operable to move said receiver along a transport path, said press having a plurality of printheads arranged along said transport path;
    said main controller receiving job data from one or more of said input units and segmenting said job data into segments;
    said downstream processors receiving said segments from said main controller, said downstream processors raster image processing respective said segments to provide respective printable frames, said downstream processors including memory, each said downstream processor supplying respective said segments to one or more of said printheads, via respective print queues in said memory;

said press printing said supplied segments on said receiver using said printheads;

one of said input units having a user interface operatively connected to said main controller, said user interface being operable by a user to send a job halt request to said main controller during said printing;

said main controller transmitting disable commands to said downstream processors responsive to said job halt request;

said downstream processors sending acknowledgements of respective said disable commands to said main controller;

said main controller assigning each of said downstream processors to multitasking and into one or more groups, following the sending of respective said acknowledgements;

said grouped downstream processors emptying said print queues, said emptying being multi-tasked between said grouped downstream processors.

15. The system of claim 14 wherein said emptying is concurrent among two or more of said print queues.

16. The system of claim 14 wherein said printheads are sequentially arranged relative to said transport path and said printing further comprises transporting said receiver along said transport path and using each of said plurality of printheads to sequentially mark said receiver to provide a printed output having one or more documents, said sequential marking of each said document adding respective said printable frames in registry.

17. The system of claim 16 wherein said receiver is a web and said transport unit continuously transports said web independent of said job halt request.

18. The system of claim 14 wherein said main controller distributes the segments of remaining said job data to said downstream processors following said emptying, said downstream processors process and supply the remaining segments to the printheads, said press prints said supplied remaining segments on said receiver using said printheads, and said transport unit transports said receiver continuously throughout the printing prior to said job halt request, the emptying, and the printing of said remaining segments.

19. The system of claim 18 wherein said main controller delays the supplying of said remaining segments to said downstream processors until the emptying of the print queues is completed.

20. The system of claim 14 wherein each of said downstream processors includes one or more microprocessors and said microprocessors are multitasked in said emptying.

21. The system of claim 14 wherein said main controller transmits said disable commands sequentially and waits to receive each said acknowledgement prior to the transmitting of the next said disable command.

* * * * *